United States Patent
Hamer et al.

(10) Patent No.: US 8,513,541 B2
(45) Date of Patent: Aug. 20, 2013

(54) METHOD OF BLOCKING ELECTRO-MAGNETIC INTERFERENCE (EMI) IN AN ELECTRIC MACHINE AND APPARATUS

(75) Inventors: Colin J. Hamer, Noblesville, IN (US); Bradley D. Chamberlin, Pendleton, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 219 days.

(21) Appl. No.: 13/010,898

(22) Filed: Jan. 21, 2011

(65) Prior Publication Data

US 2012/0186869 A1  Jul. 26, 2012

(51) Int. Cl.
*H05K 9/00* (2006.01)

(52) U.S. Cl.
USPC .......................................... 174/382; 361/818

(58) Field of Classification Search
USPC ....... 174/350, 382, 377; 310/89; 361/679.01
See application file for complete search history.

(56) References Cited

U.S. PATENT DOCUMENTS

| | | | |
|---|---|---|---|
| 5,132,191 A | 7/1992 | Zarnoch | |
| 5,180,513 A | 1/1993 | Durand | |
| 5,861,691 A * | 1/1999 | Soh et al. | 310/89 |
| 6,066,907 A * | 5/2000 | Matsushima et al. | 310/239 |
| 6,090,728 A | 7/2000 | Yenni, Jr. et al. | |
| 6,744,640 B2 | 6/2004 | Reis et al. | |
| 6,849,800 B2 | 2/2005 | Mazurkiewicz | |
| 6,858,955 B2 * | 2/2005 | Lau | 310/51 |
| 6,865,805 B2 * | 3/2005 | Dispenza et al. | 29/848 |
| 6,933,638 B2 * | 8/2005 | Hirth | 310/71 |
| 7,122,928 B2 * | 10/2006 | Shindo | 310/89 |
| 7,804,212 B2 * | 9/2010 | Moody | 310/88 |
| 2001/0018979 A1 * | 9/2001 | Dispenza et al. | 174/35 R |
| 2001/0033478 A1 | 10/2001 | Ortiz et al. | |
| 2004/0194988 A1 | 10/2004 | Chen | |
| 2009/0086462 A1 | 4/2009 | Funato et al. | |
| 2010/0253160 A1 * | 10/2010 | Jones et al. | 310/43 |
| 2010/0309644 A1 | 12/2010 | Choi et al. | |
| 2010/0319948 A1 * | 12/2010 | Vander Ploeg et al. | 174/2 |

FOREIGN PATENT DOCUMENTS

JP  2007159240 A  6/2007

OTHER PUBLICATIONS

International Search Report and Written Opinion for PCT Application No. PCT/US2012/021661, dated Aug. 17, 2012, pp. 1-9.

\* cited by examiner

*Primary Examiner* — Hoa C Nguyen
*Assistant Examiner* — Amol Patel
(74) *Attorney, Agent, or Firm* — Cantor Colburn LLP

(57) ABSTRACT

A method of blocking electro-magnetic interference (EMI) in an electric machine having a housing including an interior portion, an opening leading to the interior portion, and an enclosure positioned about the opening, includes positioning an EMI blocking member in the enclosure across the opening. The EMI blocking member includes an insulating layer having a first surface and a second surface. An EMI shield member is positioned on one of the first and second surfaces. The EMI shield member includes a surface formed from an electrically conductive material that substantially covers the one of the first and second surfaces. The EMI shield member is grounded to the housing. The EMI shield member is configured and disposed to block EMI release from the housing via the enclosure.

9 Claims, 2 Drawing Sheets

METHOD OF BLOCKING ELECTRO-MAGNETIC INTERFERENCE (EMI) IN AN ELECTRIC MACHINE AND APPARATUS

BACKGROUND OF THE INVENTION

Exemplary embodiments pertain to the art of electric machines and, more particularly, to a method of blocking electro-magnetic interference (EMI) in an electric machine.

Electric machines, particularly high voltage electric machines, produce electro-magnetic or radio frequency interference (EMI) at high levels. The EMI can interfere with other electronic devices. Therefore, it is necessary to prevent stray EMI from escaping from electric machines. Moreover, federal regulations establish limits on EMI/RFI levels for electrical products. Manufactures must ensure that stray EMI emissions remain below the federally mandated levels.

High voltage electric machines typically include a housing formed from an electrically conductive material. The housing includes an interior portion and an enclosure that provide access to power connections, switches and the like. The enclosure includes an access port that is provided with a cover. The cover is also formed from an electrically conductive material. In order to confine EMI emissions to the interior portion, the housing and cover are connected to an electrical ground. Various applications require that the enclosure remain sealed. In such cases, in order to ensure that all portions of the housing remain electrically grounded, a gasket formed from an electrically conductive material is positioned between the enclosure and the cover.

BRIEF DESCRIPTION OF THE INVENTION

Disclosed is a method of blocking electro-magnetic interference (EMI) in an electric machine having a housing including an interior portion, an opening leading to the interior portion, and an enclosure positioned about the opening. The method includes positioning an EMI blocking member in the enclosure across the opening. The EMI blocking member includes an insulating layer having a first surface and a second surface. An EMI shield member is positioned on one of the first and second surfaces. The EMI shield member includes a surface formed from an electrically conductive material that substantially covers the one of the first and second surfaces. The EMI shield member is grounded to the housing. The EMI shield member is configured and disposed to block EMI release from the housing via the enclosure.

Also disclosed is an electric machine including a housing formed from an electrically conductive material. The housing includes an interior portion and an opening. An enclosure is mounted to the housing about the opening. The enclosure includes a side wall that defines an access port and a hollow interior. An EMI blocking member is mounted in the enclosure. The EMI blocking member includes an insulating layer having a first surface and a second surface, and an EMI shield member arranged on one of the first and second surfaces. The EMI shield member comprises a surface formed from an electrically conductive material that substantially covers the one of the first and second surfaces. A grounding member extends between the EMI shield member and the housing. The grounding member establishes an electrical ground between the EMI shield member and the housing.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
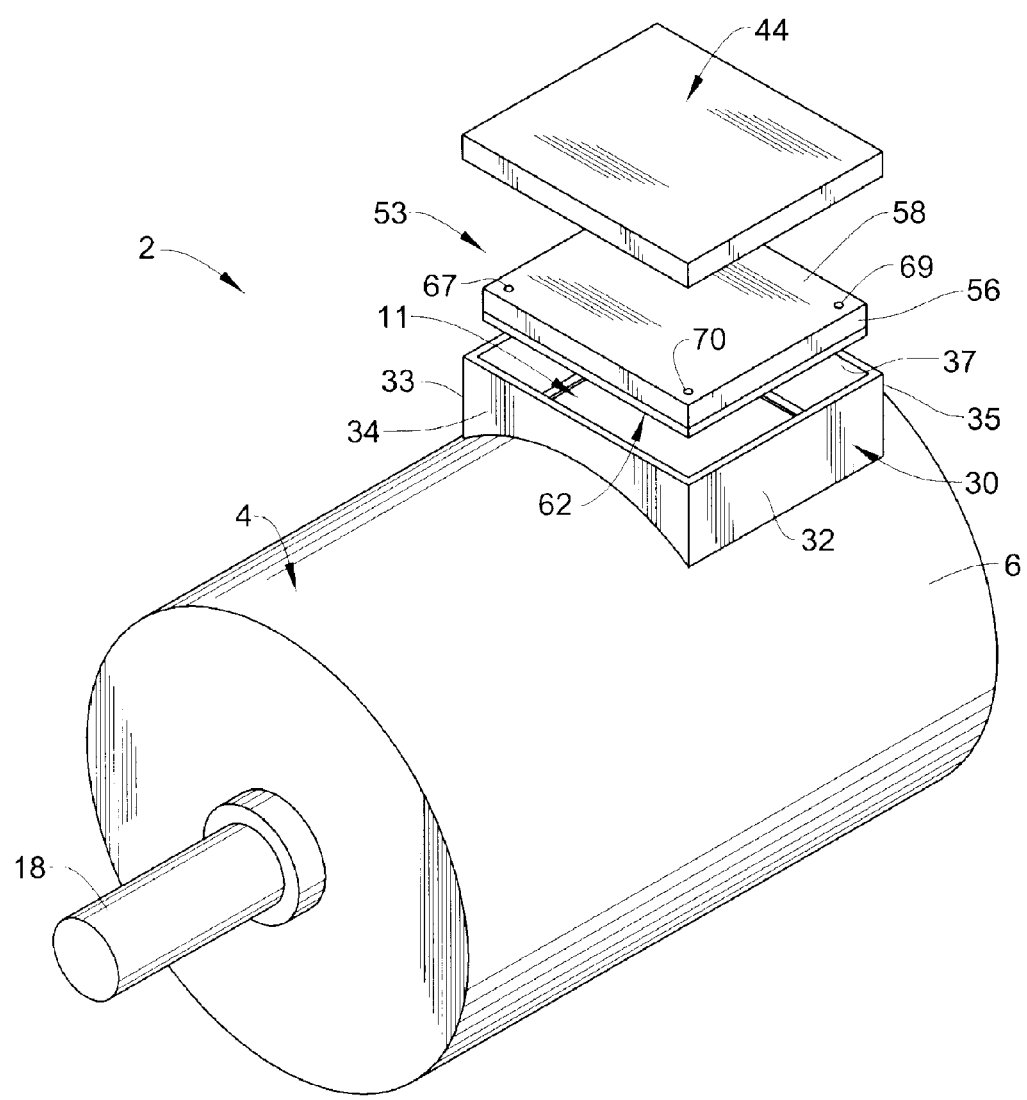
FIG. 1 is a perspective view of an electric machine including an electro-magnetic interference (EMI) blocking member in accordance with an exemplary embodiment.
Figure 2:
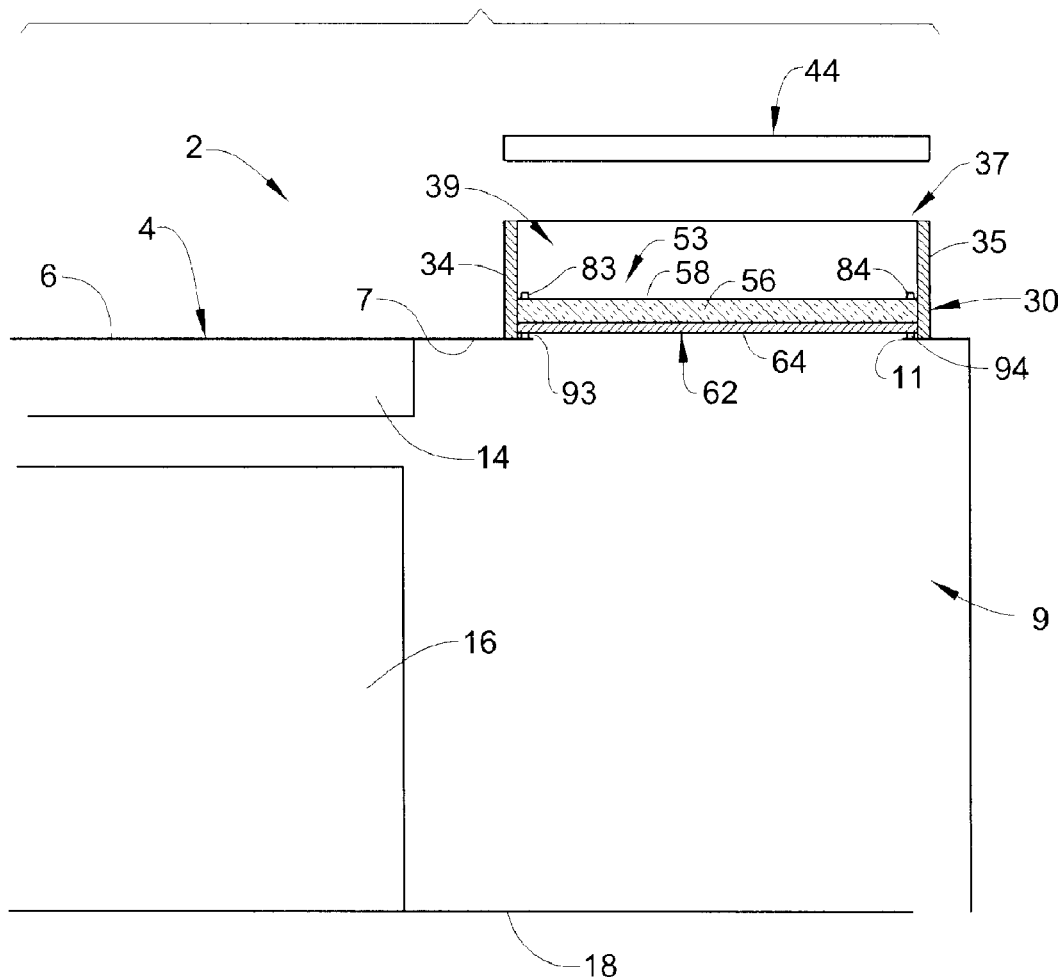
FIG. 2 is a partial cross-sectional view of the electric machine if FIG. 1.
Figure 3:
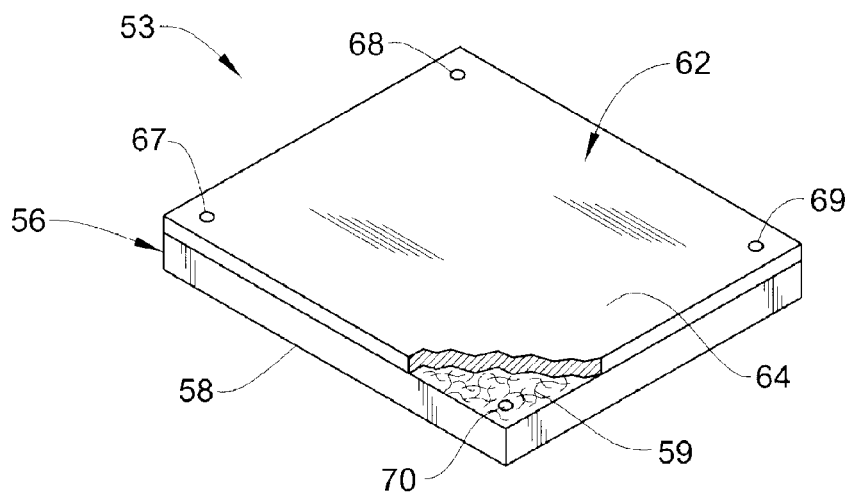
FIG. 3 is a perspective view of the EMI blocking member in accordance with the exemplary embodiment.

With reference to FIGS. 1-2, an electric machine in accordance with an exemplary embodiment is indicated generally at 2. Electric machine 2 includes a housing 4 having an outer surface 6 and an inner surface 7 that defines an interior portion 9. Housing 4 is formed from an electrically conducting material and includes an opening 11 at a rear portion thereof that provides access to interior portion 9. More specifically, opening 11 provides a passage for conductors (not shown) that pass from a stator 14. The conductors are coupled to a power supply (also not shown) that provides power to electric machine 2. Electric machine 2 is also shown to include a rotor 16 that is mounted to a shaft 18. An electro-motive force causes rotor 16 to rotate relative to stator 14. The rotation is imparted to shaft 18, which, in turn, is used to provide mechanical energy to an external device (not shown). In accordance with the exemplary embodiment shown, electric machine 2 operates on high voltage. More specifically, electric machine 2 operates on voltage of at least 24 volts.

In further accordance with the exemplary embodiment, electric machine 2 includes an enclosure 30 that extends about opening 11. Enclosure 30 provides access to, for example, the conductors that pass from stator 14. Enclosure 30 includes first and second opposing side walls 32 and 33 that are joined with third and fourth opposing side walls 34 and 35 to define an access port 37. Access port 37 leads to a hollow interior 39. Enclosure 30 is provided with a cover member 44, which, in accordance with the exemplary embodiment, is formed from a non-electrically conducting material such as plastic or the like. As cover member 44 is formed from a non-electrically conducting material, it is necessary to provide a mechanism to block stray electro-magnetic interference (EMI) from exiting electric machine 2 via enclosure 30.

In order to block stray EMI, electric machine 2 includes an EMI blocking member 53 positioned within enclosure 30 across opening 11. EMI blocking member 53 includes an insulating layer 56 having a first surface 58 and an opposing second surface 59. An EMI shield member 62 is provided on second surface 59. EMI shield member 62 is formed from an electrically conductive material and includes a continuous, uninterrupted, substantially planar surface 64. In accordance with one aspect of the exemplary embodiment, EMI shield member 62 is formed from copper. However, it should be understood that EMI shield member 62 could be formed from other electrically conducting materials. EMI blocking member 53 is shown to include a plurality of openings 67-70 that extend through insulating layer 56 and EMI shield member 62. Openings 67-70 are configured to receive grounding members shown in the form of fasteners, two of which are shown at 83 and 84, that engage with mounting elements, two of which are shown at 93 and 94, provided on outer surface 6 of housing 4. Mounting elements 93 and 94 are electrically grounded relative to housing 4. With this arrangement, once EMI blocking member 53 is arranged within enclosure 30 across opening 11, fasteners 83 and 84 are passed through openings 67 and 68 and into mounting elements 93 and 94. Fasteners 83, 84 establish an electrical ground between EMI shield member 62 and housing 4.

At this point it should be understood that by grounding EMI shield member 62 to housing 4, EMI blocking member 53 prevents stray EMI from escaping through opening 11. Positioning EMI blocking member 53 across opening 11 allows cover member 44 to be formed from non-electrically conducting material while also ensuring that electric machine 2 remains EMI emission compliant. It should also be understood that the grounding member can take on a variety of forms and need not include structure that secures the EMI blocking member to the electric machine.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of blocking electro-magnetic interference (EMI) in an electric machine having a housing including an interior portion, an opening leading to the interior portion, and an enclosure positioned about the opening, the method comprising:
    positioning an EMI blocking member in the enclosure across the opening, the EMI blocking member including an insulating layer having a first surface and a second surface, and an EMI shield member positioned on one of the first and second surfaces, the EMI shield member being formed from an electrically conductive metal that substantially covers the one of the first and second surfaces; and
    grounding the EMI shield member to the housing, the EMI shield member being configured and disposed to block EMI release from the housing via the enclosure.

2. The method of claim 1, further comprising: securing a cover member formed from a non-electrically conducting material across an access port of the enclosure.

3. The method of claim 1, wherein grounding the EMI shield member to the housing includes securing the EMI shield member in the enclosure.

4. The method of claim 1, wherein securing the EMI shield member in the enclosure includes passing a fastener through the EMI blocking member, the fastener being configured and disposed to electrically join the EMI shield member and the housing.

5. An electric machine comprising:
    a housing formed from an electrically conductive material, the housing including an interior portion and an opening;
    an enclosure mounted to the housing about the opening, the enclosure including a side wall that defines an access port and a hollow interior;
    an EMI blocking member mounted in the enclosure, the EMI blocking member including an insulating layer having a first surface and a second surface, and an EMI shield member arranged on one of the first and second surfaces, the EMI shield member being formed from an electrically conductive metal that substantially covers the one of the first and second surfaces; and
    a grounding member extending between the EMI shield member and the housing, the grounding member establishing an electrical ground between the EMI shield member and the housing.

6. The electric machine according to claim 5, further comprising: a cover member positioned upon the enclosure across the access port, the cover being formed from a non-electrically conducting material.

7. The electric machine according to claim 5, wherein the EMI shield member is formed from copper.

8. The electric machine according to claim 5, wherein the EMI shield member comprises a continuous, substantially planar, surface.

9. The electric machine according to claim 5, wherein the grounding member comprises a fastener that secures the EMI blocking member in the enclosure.

* * * * *